Dec. 4, 1928. Re. 17,151

S. J. STRID

MOUNTING FOR BRAKE GEARS

Original Filed Aug. 5, 1925

Inventor:
SVEN JULIUS STRID
By E. K. Lundy
Atty's

Reissued Dec. 4, 1928.

Re. 17,151

UNITED STATES PATENT OFFICE.

SVEN JULIUS STRID, OF CHICAGO, ILLINOIS, ASSIGNOR TO FRED MATHEWS, OF CHICAGO, ILLINOIS.

MOUNTING FOR BRAKE GEARS.

Original No. 1,557,733, dated October 20, 1925. Serial No. 48,423, filed August 5, 1925. Application for reissue filed September 25, 1926. Serial No. 137,786.

My present invention relates to a means for mounting a gearing for operating a brake mechanism on a railway car, and the primary object is to provide a mounting that is strong and durable and which is capable of withstanding the rough usage to which railway cars, especially freight-cars, are subjected. It is also an object to provide a structure that may be readily secured to the car sill without the use of special tools.

I prefer to carry out my invention and accomplish the several objects in substantially the following manner, reference being now made to the accompanying drawings that form a part of this specification.

In the drawings:—

The drawings illustrate a typical or preferred embodiment of my invention and I have employed similar reference characters to designate like parts wherever the same appear throughout the several views of the drawings.

Figure 2:
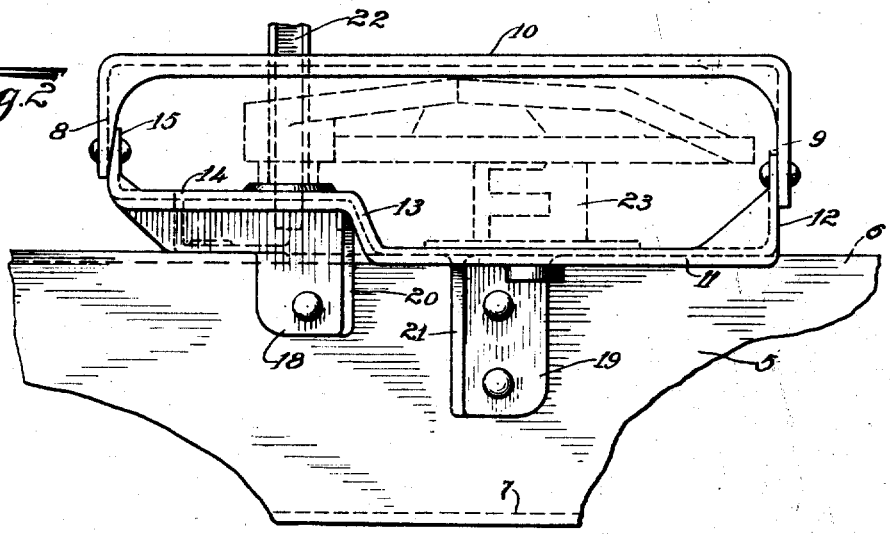
Figure 2 is a front elevation of the sill and my gear mounting.
Figure 3:
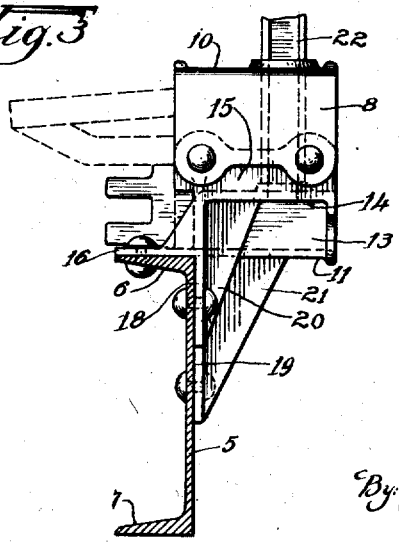
Figure 3 is an end view of the structure shown in Figures 1 and 2.

The end-sill 5 of the car or under-frame is a channel beam, in the present instances, that is positioned with its web vertical and with its upper and lower flanges, 6 and 7, respectively, extended inwardly, so that a smooth surface is presented at the end of the car. The mounting, in the present instance, is adapted to support and position the brake operating gearing in a plane above the upper flange 6 of the end-sill, as seen in Figures 2 and 3. This gearing is, preferably, of the type disclosed in U. S. Patent No. 1,508,564, issued September 16th, 1925, to Fred Mathews. The two gear elements, shown on dotted lines in the drawings, are mounted to rotate between top and bottom castings of the mounting, the former of which is of inverted U-shape (Fig. 2), there being side flanges 8 and 9 depending from the elongated horizontal connecting-plate 10. The bottom casting comprises a horizontal plate 11, one end of which is provided with an upstanding flange 12, that fits inside the flange 9 of the top casting, and bolted or riveted thereto. Intermediate its ends the plate 11 has an upwardly extending portion 13 to the upper end of which is connected the shelf or elevated portion 14 that extends to the opposite end of the plate 11, while at the end of the shelf there is an upstanding flange 15, positioned inside of and bolted or riveted to the depending flange 8 of the top casting.

Figure 1:
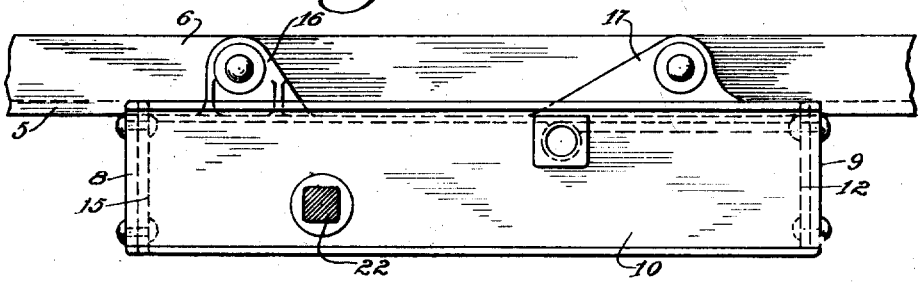
Figure 1 is a top plan of a portion of a car end-sill showing my invention installed thereon.

The irregularly shaped lugs 16 and 17 project laterally in a horizontal direction from the longitudinal edge of the bottom casting nearest the end-sill, and these lugs are in the same horizontal plane with each other so that they rest upon the upper surface of the top flange 6 of the end-sill and support the top and bottom castings and the gearing contained therein. As the pull, incident to the winding of the brake-chain, is longitudinally of the car, and inside of the sill, or from the left in Fig. 3, it is desirable to further reinforce the housing of mounting and in order to do this I have provided means which may be in the form of two vertical bracing lugs, 18 and 19, the former preferably being shorter than the latter. These lugs are braced by tapered gusset flanges, 20 and 21, respectively and said bracing-lugs are in the same plane with each other, and are at right-angles to lugs 16 and 17, so that they are positioned flat against the outer surface of the web 5 of the end-sill, to which they are bolted or riveted. As will be seen in Figures 1 and 2, the vertical reinforcing-lugs, 18 and 19 are located intermediate the lugs, 16 and 17, and lug 18 is in alinement, longitudinally of the car, with the gear winding shaft 22, while the lug 19 similarly alines with the chain winding drum 23 of the gearing, so that the pull or stress exerted by the shaft and chain will be directed straight to the respective bracing-lugs.

What I claim as new is:—

1. The combination with an angular end sill of a railway car, of a brake-gear mounting device comprising an inverted U-shaped top casting, a bottom casting having flanged ends secured to the top casting, said bottom casting being provided with a plurality of lugs disposed at right angles to each other, certain of said lugs resting upon the horizontal portion of said end-sill whereby to support the brake-gearing above the end-sill, and the other lug or lugs engaging and secured to the vertical portion of the end-sill whereby to brace the structure against stress longitudinally of the car.

2. The combination with the end sill of a railway-car, of a brake-gear mounting device one of the members of which is provided with spaced horizontal lugs that rest upon the upper edge of the end sill, and depending vertical lugs, intermediate said first mentioned lug, that are secured to a vertical face of the end sill.

3. A brake gear mounting device comprising a top casting and a bottom casting secured thereto, said bottom casting provided with a raised shelf, vertical and horizontal lugs extending from said shelf portion at right angles to each other, and a plurality of lugs extending from the remaining portion of said bottom-casting also at right angles to each other, whereby to provide supporting and reinforcing means for said mounting.

4. A brake-gear mounting device comprising a pair of spaced opposing members between which the gears are mounted, one of said members provided with elements disposed at an angle to each other whereby to position said mounting device upon the corner of an angular sill of the car with one of said elements adjacent a vertical portion of the sill and the other element adjacent a lateral portion of said sill.

5. In combination with a car end having a vertical plate and a lateral upper flange extending therefrom, a brake-gear mounting comprising an elongated upper plate, an elongated lower plate spaced therefrom and extended laterally to said vertical plate, means connecting said plates to provide a gear housing, a horizontal extension on the lower plate that is mounted on said flange, and a vertical flange on said lower plate disposed in engagement with one of the faces of said vertical plate.

6. In combination with a car end having a vertical plate and a lateral upper flange extending therefrom, a brake-gear mounting comprising an elongated upper plate, an elongated lower plate spaced therefrom and extended laterally to said vertical plate, means connecting said plates to provide a gear housing, said lower plate having a horizontal extension in alinement therewith that rests on and is secured to the lateral flange of the car end, and said lower plate having a vertical flange at right-angles to said extension that fits against and is secured to the outer face of the vertical plate of the car end.

7. In combination with a car end having a vertical plate and a lateral upper flange extending therefrom, a brake-gear mounting comprising an elongated upper plate, an elongated lower plate spaced therefrom and extended laterally to said vertical plate, means at the ends of said plates connecting the latter which means with said plates provide a gear housing, said lower plate having a horizontal extension in alinement therewith that rests on and is secured to the lateral flange of the car end, and said lower plate having a vertical flange at right-angles to said extension that fits against and is secured to the outer face of the vertical plate of the car end.

Signed at Chicago, Illinois, the 11th day of May, 1926.

SVEN JULIUS STRID.